J. C. McATEE.
TRAP.
APPLICATION FILED MAR. 15, 1911.

997,841.

Patented July 11, 1911.

2 SHEETS—SHEET 1.

Witnesses
Geo. L. Thom
A. C. Blakeney

Inventor
J. C. McAtee.

By Franklin W. Hoyt
Attorney

J. C. McATEE.
TRAP.
APPLICATION FILED MAR. 15, 1911.
997,841.
Patented July 11, 1911.
2 SHEETS—SHEET 2.
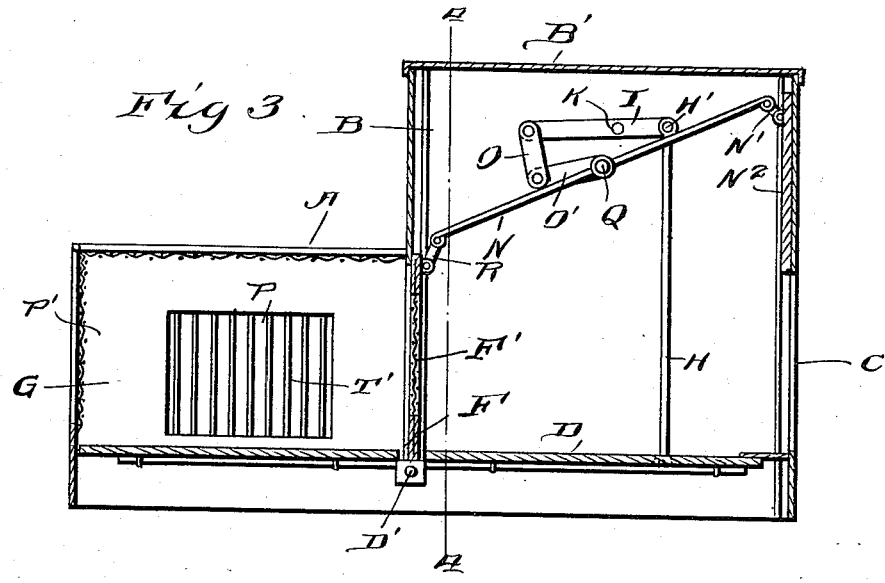
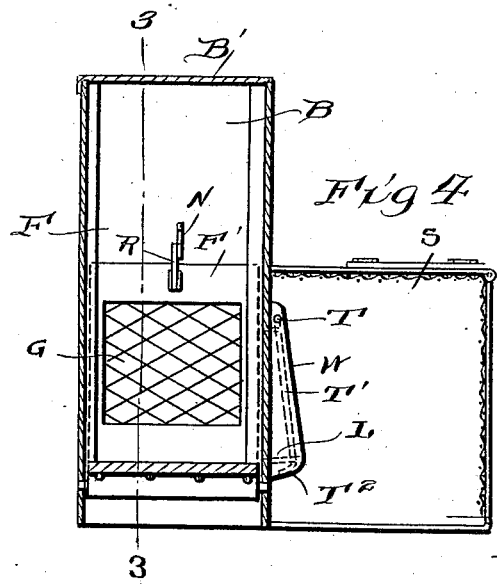
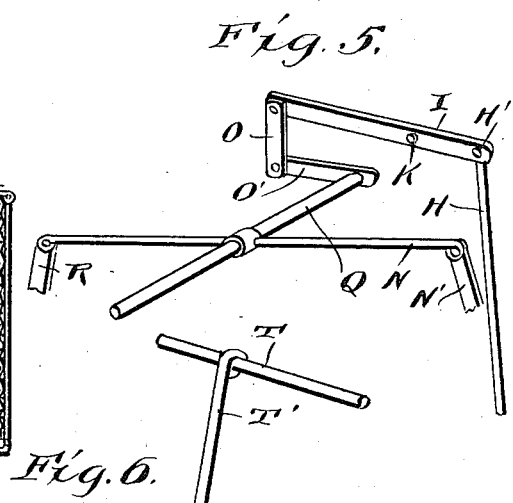
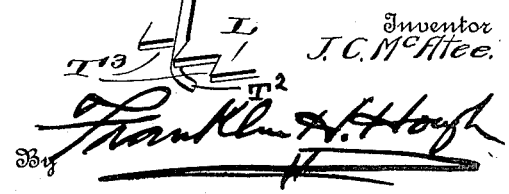
Witnesses
Geo. T. Thom
A. C. Blakeny.
Inventor
J. C. McAtee.
By Franklin H. Hough
Attorney

UNITED STATES PATENT OFFICE.

JAMES CORNELIOUS McATEE, OF HIWASSE, ARKANSAS.

TRAP.

997,841.   Specification of Letters Patent.   Patented July 11, 1911.

Application filed March 15, 1911.   Serial No. 614,686.

*To all whom it may concern:*

Be it known that I, JAMES C. MCATEE, a citizen of the United States, residing at Hiwasse, in the county of Benton and State of Arkansas, have invented certain new and useful Improvements in Traps; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in self-setting and ever-set cage traps and comprises various details of construction and combinations and arrangements of parts which will be hereinafter fully described and then specifically defined in the appended claim.

I illustrate my invention in the accompanying drawings, in which:—

Figure 1:
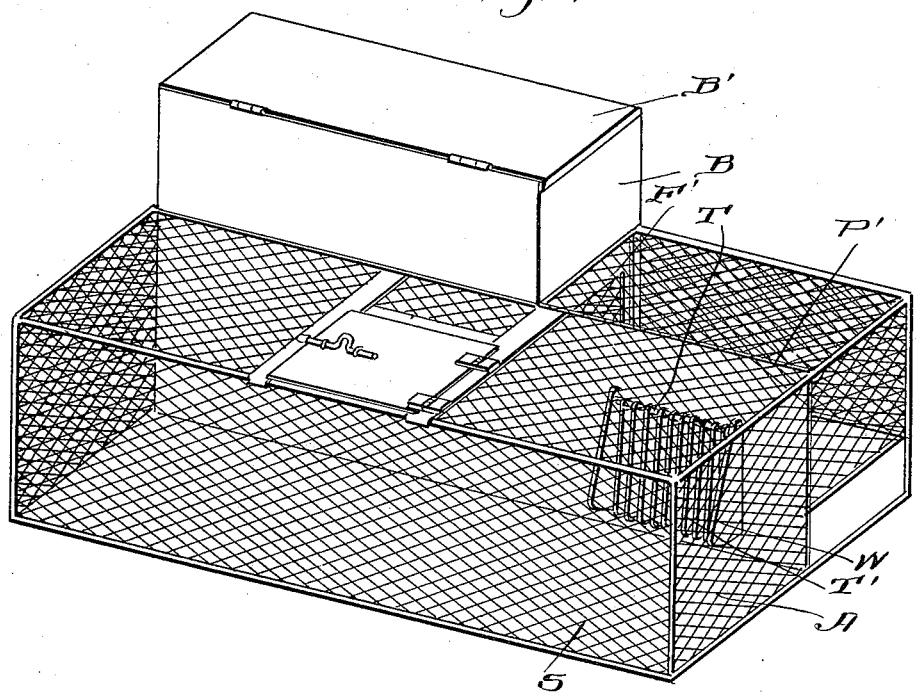
Figure 2:
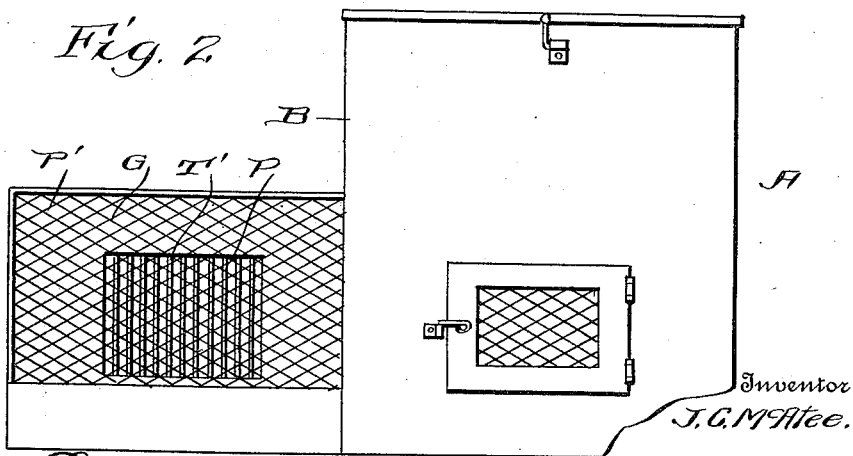

Figure 1 is a perspective view of a trap made in accordance with my invention. Fig. 2 is an elevation of one side of the trap. Fig. 3 is a vertical sectional view on line 3—3 of Fig. 4. Fig. 4 is a sectional view on line 4—4 of Fig. 3. Fig. 5 is a detail perspective view of the platform lever-actuated mechanism, and Fig. 6 is a detail perspective view of a part of the invention.

Reference now being had to the details of the drawings by letter, A designates the cage of the trap which in the present instance is shown as being divided into three compartments, one of which, designated by letter B, is higher than the other parts and provided with a hinged top B′ and an opening C, shown in Fig. 3 of the drawings. A platform D is provided, having a pivotal point D′ underneath the partition F which is provided with a door F′ leading into the compartment G. One end of said platform forms the floor to the compartment B and the other to the compartment G. A rod H is pivotally connected at its lower end to one end of the platform in the compartment B and its upper end is pivoted by means of a pin H′ to a lever I mounted upon the pivot K. The lever I is pivotally connected by means of links O and O′ with the rock shaft Q which is journaled in the opposite walls of the compartment B. A rod N is pivotally connected at N′ with the door N² which is adapted, when one end of the platform D is depressed, to close the opening C under the weight of the animal as it enters the trap, while the other end of the rod N is pivotally connected at R to a door F′, designed to open the passageway in the partition F simultaneously with the closing of the door N², thus allowing the animal to pass from the compartment B into the compartment G. As the animal enters the compartment F and its weight comes upon the end of the platform which forms the bottom of said compartment G, the rod H will cause the door N² to open and the door F′ to close. The only means of exit for the animal from the compartment G will be through the opening P in the partition P′ and into the compartment S.

Pivotally mounted upon a rod T, shown in Figs. 1, 4 and 6 of the drawings, is a series of rods T′, the lower end T² of each being angled and adapted to engage one of the notches T³ formed in the marginal edge of the plate L which forms the bottom marginal edge of the opening P. Guards W project from the opposite marginal edges of the opening P and preventing access being had to the opening in the event of the animal attempting to return back through into the compartment B after having entered the compartment G.

The various angled rods being independent one of another and held in the notches as shown, I have found to be very effectual in preventing the animal escaping when once it passes by the same into the compartment G.

What I claim to be new is:—

A victim set trap comprising a cage with a door opening in the wall thereof, a tilting platform forming the bottom of the cage, a shelf projecting laterally from the wall of the casing below the door opening and against which one end of the tilting platform is designed to contact to limit its movement in one direction, a partition within the casing directly over the pivotal part of the platform and having a door opening therein, a rock shaft mounted in the opposite walls of the casing, rods secured to and projecting from said shaft, doors to said openings, links pivotally connecting said doors and rods, a pivotal lever mounted on the side wall of the casing, a rod pivotally connecting said lever and platform, and pivotal link connections between the lever and rock shaft.

In testimony whereof I hereunto affix my signature in the presence of two witnesses.

JAMES CORNELIOUS McATEE.

Witnesses:
MAUD ADCOCK,
J. B. EDWARDS.

Copies of this patent may be obtained for five cents each, by addressing the "Commissioner of Patents, Washington, D. C."